United States Patent [19]

Omika et al.

[11] 4,265,793
[45] May 5, 1981

[54] CATHODE-PRECIPITATING ELECTRODEPOSITION COATING COMPOSITION

[75] Inventors: Hiroyoshi Omika, Yokohama; Hajime Hara, Fujisawa; Yutaka Otsuki, Yokohama; Yoshihiko Araki, Kawasaki; Kazuho Aoyama, Tokyo, all of Japan

[73] Assignee: Nippon Oil Company, Ltd., Japan

[21] Appl. No.: 88,653

[22] Filed: Oct. 26, 1979

[30] Foreign Application Priority Data

Nov. 1, 1978 [JP] Japan .................. 53-133772
Sep. 17, 1979 [JP] Japan .................. 54-117857

[51] Int. Cl.³ ............... C08G 59/50; C09D 5/40; C25D 13/06
[52] U.S. Cl. ............... 260/23 EP; 106/243; 106/252; 204/181 C; 260/18 EP; 260/18 PN; 260/18 PF; 260/29.2 EP
[58] Field of Search .......... 204/181 C; 260/23 EP, 260/18 EP, 29.2 EP, 18 PN, 18 PF; 106/243, 252

[56] References Cited

U.S. PATENT DOCUMENTS

| | | | |
|---|---|---|---|
| 3,719,626 | 3/1973 | May | 204/181 C |
| 3,789,090 | 1/1974 | Otsuki et al. | 526/173 |
| 3,804,786 | 4/1974 | Sekmakas | 260/18 EP |
| 3,971,709 | 7/1976 | Ohsawa et al. | 204/181 C |
| 4,101,486 | 7/1978 | Bosso et al. | 204/181 C |
| 4,104,147 | 8/1978 | Marchetti et al. | 204/181 C |
| 4,134,932 | 1/1979 | Kempter et al. | 204/181 C |
| 4,138,377 | 2/1979 | Otsuki et al. | 204/181 C |
| 4,139,396 | 2/1979 | Otsuki et al. | 260/18 EP |
| 4,144,159 | 3/1979 | Bosso et al. | 204/181 C |
| 4,182,831 | 1/1980 | Hicks | 204/181 C |

FOREIGN PATENT DOCUMENTS 51-119727 10/1976 Japan .
53-63439 6/1978 Japan .

*Primary Examiner*—Ronald W. Griffin

*Attorney, Agent, or Firm*—Wenderoth, Lind & Ponack

[57] ABSTRACT

A coating composition for cathode-precipitating electrodeposition consisting essentially of (A) 100 parts by weight of an unsaturated organic compound having a molecular weight of 300 to 5,000 containing a carbon-carbon double bond in an amount corresponding to an iodine value of 100 to 500, said unsaturated organic compound having bonded thereto, through a carbon-carbon bond, basic groups of the formula

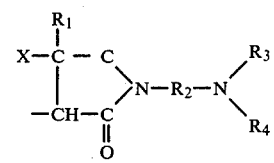

wherein $R_1$, $R_2$, $R_3$, $R_4$ and X are as defined in claim 1, the amount of said basic groups in said component (A) being 0.05 to 0.5 mole per 100 g of said component (A), and (B) 3 to 100 parts by weight of at least one compound represented by the general formula

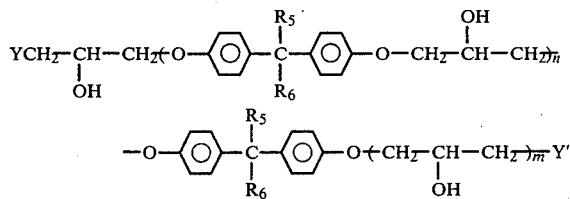

wherein $R_5$, $R_6$, n, m, Y and Y' are as defined in claim 1, said component (A) and said component (B) being neutralized with an organic acid or an inorganic acid and dissolved or dispersed in water.

8 Claims, No Drawings

CATHODE-PRECIPITATING ELECTRODEPOSITION COATING COMPOSITION

This invention relates to a coating composition for cathode-precipitating electrodeposition.

A resin having a certain basic group generates a cationic resin in water, and when used in electrodeposition, deposits on a cathode. Cathode-depositing paints of this type can remove the defect of the dissolving of a metal to be coated in a coating bath which defect is inherent to conventional anode-precipitating electrodeposition paints resulting from the water-solubilization of resins having acid groups by neutralization with bases, and can overcome the various problems attributed to this defect.

We previously made investigations about such cathode-precipitating paints, and found that a coating composition for cathode-precipitating electrodeposition which has high storage stability and excellent curability and can give a coated film having excellent resistance to external mechanical forces such as impact and bending and excellent chemical resistance to alkalies, water and solvents can be prepared by neutralizing a conjugated diene polymer or copolymer containing a basic group of the general formula

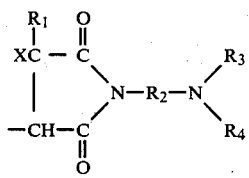

wherein $R_1$ represents a hydrogen or halogen atom or a hydrocarbon group having 1 to 3 carbon atoms, $R_2$ represents a hydrocarbon group having 1 to 20 carbon atoms, $R_3$ and $R_4$ represent a hydrogen atom or a hydrocarbon group having 1 to 20 carbon atoms which may be partly replaced by a hydroxyl group, at least one of $R_3$ and $R_4$ is said hydrocarbon group, X represents a hydrogen atom or a bond, and when X represents a bond, the carbon atom to which $R_1$ is attached and the adjacent carbon atom to which hydrogen is attached may form a part of the main chain, with an organic or inorganic acid, and then dispersing or dissolving the resulting resin in water. This technique was already applied for a patent (Japanese Laid-Open Patent Publication No. 119727/76 and Japanese Patent Application No. 138406/76).

By ordinary baking, this polymer having the basic group described above gives a cured paint film having various superior properties owing mainly to the oxidative polymerization of the unsaturated group. The paint film, however, cannot fully meet the rigorous requirement of corrosion resistance, for example, the corrosion resistance of the paint film on an untreated steel sheet.

It is an object of this invention therefore to provide a cathode-precipitating electrodeposition coating composition having improved corrosion resistance.

The above object of this invention is achieved by a coating composition for cathode-precipitating electrodeposition consisting essentially of (A) 100 parts by weight of an unsaturated organic compound having a molecular weight of 300 to 5,000 containing a carbon-carbon double bond in an amount corresponding to an iodine value of 100 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, basic groups of the formula

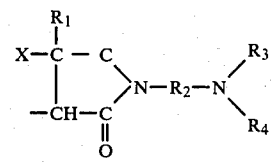

wherein $R_1$ represents a hydrogen or halogen atom or a hydrocarbon group having 1 to 3 carbon atoms, $R_2$ represents a hydrocarbon group having 1 to 20 carbon atoms, $R_3$ and $R_4$ represent a hydrogen atom or a hydrocarbon group having 1 to 20 carbon atoms which may be partly replaced by a hydroxyl group, at least one of $R_3$ and $R_4$ is said hydrocarbon group, X represents a hydrogen atom, or a bond, and when X represents a bond, the carbon atom to which $R_1$ is attached and the adjacent carbon atom to which hydrogen is attached may form a part of the main chain, the amount of said basic groups in said component (A) being 0.05 to 0.5 mole per 100 g of said component (A), and (B) 3 to 100 parts by weight of at least one compound represented by the general formula

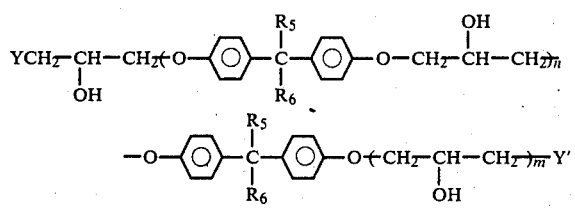

wherein $R_5$ and $R_6$, independently from each other, represent a hydrogen atom or an alkyl group having 1 to 10 carbon atoms, n is an integer of from 0 to 20, m is 1 or 0, Y is a group of the formula

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a residue of a phenolic compound having 6 to 20 carbon atoms, and Y' represents a hydrogen atom when m is 0 and Y when m is 1, said component (A) and said component (B) being neutralized with an organic acid or an inorganic acid and dissolved or dispersed in water.

The conjugated diene polymer or copolymer having the basic groups as component (A) is synthesized by imidizing a conjugated diene polymer or copolymer having an acid group such as a succinic acid group (e.g., adduct of maleic acid group) or its anhydride with a diamine compound of the formula

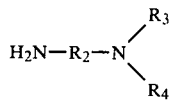

wherein $R_2$ and $R_3$ are identical or different, and represent an organic radical having 1 to 20 carbon atoms, and $R_4$ represents a hydrogen atom or an organic radical having 1 to 20 carbon atoms.

The conjugated diene polymer or copolymer having an acid group can be prepared by the addition reaction of a conjugated diene polymer or copolymer having a molecular weight of 300 to 5,000 with maleic acid, maleic anhydride, citraconic acid, citraconic anhydride, etc. at a temperature of usually 100° to 300° C. in a customary manner (Japanese Patent Publication No. 11195/71). Presence of a phenylenediamine, pyrogallol, naphthol, etc. in the addition-reaction system of the above method to prevent gellation (West German OLS No. 2362534) is preferred. The amount of the acid group such as a maleic acid, maleic anhydride, citrazonic or citraconic anhydride group to be added to the conjugated diene polymer or copolymer is 0.05 to 0.5 mole, preferably 0.1 to 0.25 mole, per 100 g of the butadiene polymer or copolymer. If the amount of the acid group is less than 0.05 mole per 100 g of the polymer or copolymer, a product obtained by reacting the polymer or copolymer with a diamine compound and neutralizing product with an acid has poor solubility in water. If the amount of the acid group is larger than 0.5 mole, the water-solubility of the neutralized resin is too good to be practical because a paint film prepared from it has poor water resistance.

The aforesaid starting conjugated diene polymer or copolymer having a molecular weight of 300 to 5,000 is produced by known conventional methods. A typical method comprises the anionic-polymerization of conjugated diolefins containing 4 or 5 carbon atom either alone, or as mixtures with each other, or with an aromatic vinyl monomer such as styrene, α-methylstyrene, vinyltoluene or divinylbenzene in an amount of not more than 50 mole % at a temperature of 0° to 100° C. in the presence of an alkali metal or organic alkali metal compound as a catalyst. In order to control the molecular weight and obtain a light-colored low polymer with a reduced gel content, it is convenient to employ a chain-transfer polymerization method using an organic alkali metal compound such as benzyl sodium as a catalyst and a compound containing an alkylaryl group such as toluene as a chain-transfer agent (U.S. Pat. No. 3,789,090), a living polymerization method carried out in a tetrahydrofuran solvent using a polynuclear aromatic compound such as naphthalene as an activator and an alkali metal such as sodium as a catalyst (Japanese Patent Publications Nos. 17485/67 and 27432/68), and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (Japanese Patent Publications Nos. 7446/57, 1245/58, and 10188/59). The polymers having a low degree of polymerization can also be produced by coordination anionic polymerization using an acetylacetonate compound of a metal of Group VIII of the periodic table, such as cobalt or nickel, and an alkylaluminum halogenide as catalysts (Japanese Patent Publications Nos. 507/70 and 30300/71).

Examples of the diamine compound of the general formula

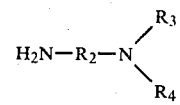

used in the production of the component (A) include diamine compounds containing both a primary amino and a secondary amino group such as beta-hydroxyethylaminoethylamine, beta-hydroxyethylaminopropylamine, methylaminoethylamine, ethylaminoethylamine, methylamino-propylamine, ethylaminopropylamine and butylaminopropylamine; and compounds containing both a primary and a tertiary amino group such as dimethylaminoethylamine, diethylaminoethylamine, dimethylaminopropylamine, diethylaminopropylamine and dibutylaminopropylamine.

$R_2$, $R_3$ and $R_4$ are generally alkyl, cycloalkyl or aryl groups, and those resulting from replacing of 1 to 3 hydrogen atoms of these groups by hydroxyl groups are also suitable.

The conjugated diene polymer or copolymer having an acid group is reacted with these diamine compounds either singly or in combination with one another. The reaction is an imidization reaction between the succinic acid group and the primary amino group. The amount of the diamine compound is preferably equimolar to the succinic acid group of the conjugated diene polymer or copolymer. It is also possible to use an excess of the diamine compound and distill it off after the reaction. It is also possible to leave carboxyl groups by using the diamine compound in an amount less than one mole per mole of the succinic acid group. A diamine compound having a primary and a secondary amino group may be used as a mixture with a diamine compound having a primary and a tertiary amino group. In this reaction, the mole ratio between the diamines used in the reaction and that of the diamines introduced into the reaction product are usually nearly equal.

A part of the diamine compound used may be replaced by an alkanolamine having a primary amino group such as monoethanolamine. The alkanolamine having a primary amino group, like the diamine compound, can be condensed with the succinic acid group of the conjugated diene polymer or copolymer by the imidization reaction, and this results in the introduction of a hydroxyl group.

The imidization reaction between the conjugated diene polymer or copolymer having an acid group and the diamine compound is carried out at a temperature of from 50° to 300° C., preferably from 100° to 200° C.

The imidization reaction can be performed in the presence or absence of a solvent. The absence of solvent is preferred when the conjugated diene polymer or copolymer having an acid group to be imidized has a low viscosity. The solvent that may be used should be miscible with the conjugated diene polymer or copolymer having an acid group, and includes, for example, hydrocarbon solvents such as benzene, toluene, cyclohexane and xylene, alcohol solvents such as butyl Cellosolve, and ether solvents such as diethylene glycol dimethyl ether. Preferably, a hydrophilic solvent such as butyl Cellosolve is used, and the resulting product as a solution is directly water-solubilized as described hereinbelow.

In this manner, there can be produced a conjugated diene polymer or copolymer having a molecular weight of 300 to 5,000 and containing a basic group of the general formula

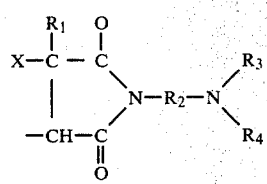

wherein $R_1$, $R_2$, $R_3$, $R_4$ and X are as defined, in an amount of 0.05 to 0.5 mole per 100 g of the diene polymer or copolymer.

The novel aspect of this invention is that the electrodeposition coating composition contains, in addition to the component (A), a component (B) which is at least one compound represented by the general formula

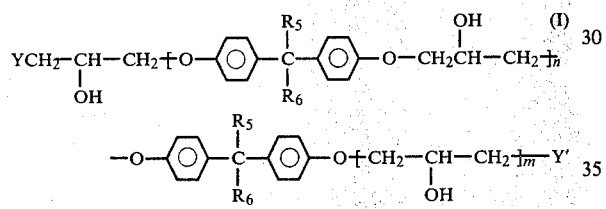

wherein $R_5$ and $R_6$, independently from each other, represent a hydrogen atom or an alkyl group having 1 to 10 carbon atoms, n is an integer of from 0 to 20, m is 1 or 0, Y is a group of the formula

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a residue of a phenolic compound having 6 to 20 carbon atoms, and Y' represents a hydrogen atom when m is 0 and Y when m is 1.

By the inclusion of the component (B), there can be obtained an electrodeposition paint having markedly improved corrosion resistance while retaining the excellent curability and film properties of the conventional cathodedepositing electrodeposition paint containing the component (A) as an essential ingredient.

The proportion of the component (B) is 3 to 100 parts by weight, preferably 10 to 50 parts by weight, of the resin (A). If the proportion of the component (B) is less than the specified limit, the corrosion resistance of a coated film prepared from the resulting composition cannot be fully improved. If it is less than the lower limit specified, the solvent resistance and physical properties of coated films prepared from the resulting composition will be deteriorated.

The compound (B) is prepared from a glycidyl compound of the general formula

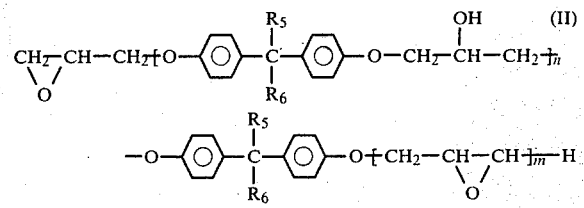

wherein $R_5$ and $R_6$ represent a hydrogen atom or an alkyl group having 1 to 10 carbon atoms, preferably a methyl or ethyl group, n is an integer from 0 to 20, preferably from 1 to 5, and m is 0 or 1, preferably 1. This glycidyl compound can usually be obtained by etherifying a bisphenol compound with epichlorohydrin in the presence of an alkali. Examples of the bisphenol compound are 2,2-bis-(4'-hydroxyphenyl)propane, 1,1-bis(4'-hydroxyphenyl)-ethane, and 1,1-bis(4'-hydroxyphenyl)isobutane. In many cases, a glycidyl compound having a somewhat higher molecular weight, which is prepared by reacting the aforesaid glycidyl ether with a bisphenol, etc., and then reacting the reaction product with epichlorohydrin, can be used in this invention.

The aforesaid glycidyl compound is reacted with a primary or secondary amine, a carboxylic acid or a phenolic compound at a temperature of 0° to 200° C., preferably 50° to 150° C. to obtain a compound of formula (I) in which Y represents

(in which $R'_3$ and $R'_4$ are as defined hereinabove), a residue of a carboxylic acid having 1 to 20 carbon atoms, or a residue of a phenolic compound having 6 to 20 carbon atoms. Generally, the reaction does not require a catalyst. But in the case of the reaction with the carboxylic acid or phenolic compound, a suitable catalyst, such as tertiary amine or quaternary ammonium base, may be used. The reaction can be performed in the presence or absence of a solvent. When the solvent is used, the same solvents as used in the production of the resin (A) can be used.

In the reaction of the glycidyl compound of formula (II) with a primary or secondary amine, the same primary or secondary amines as used in the production of the resin (A) can be used. Specifically, the primary or secondary amine used is expressed by the following general formula

wherein $R'_3$ represents an organic radical having 1 to 10 carbon atoms, preferably a hydrocarbon radical having 1 to 10 carbon atoms a part of which may be substituted by a hydroxyl group, and $R'_4$ represents a hydrogen atom, or an organic radical having 1 to 10 carbon atoms, preferably the aforesaid hydrocarbon radical.

In the present invention, the reaction of the glycidyl compound with the primary or secondary amine should be performed such that substantially all of the groups

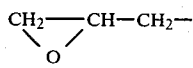

in the molecules of the glycidyl compound react with the amine to change to groups of the formula:

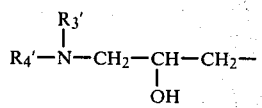

If substantial amounts of the groups

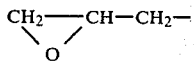

remain, these groups would undesirably react with the basic groups of the resin (A) at the time of water-solubilization with an acid, thereby causing gellation. As a result, the components (A) and (B) would have too high a viscosity to be water-solubilized. Even if water-solubilization can be effected, the aqueous solution changes with time, and uniform electrodeposition characteristics, or electrodeposited films, cannot be obtained.

When a secondary amine is used, the following amine compound forms by the following reaction.

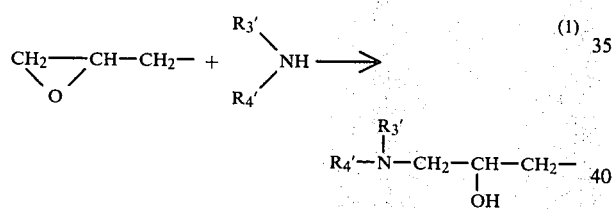

When a primary amine is used, the following amine compound forms by the following reaction.

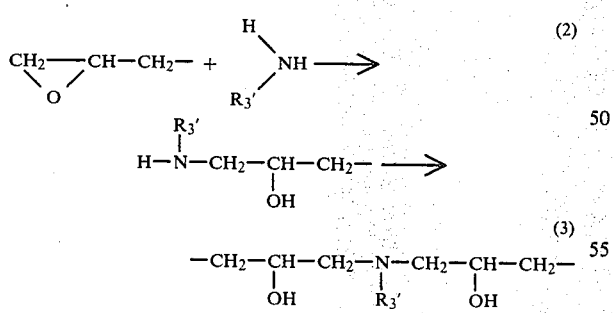

Even when the compound of formula (3) is formed as a by-product in some amount, for example in an amount less than half of the amount of the compound of formula (2), the resulting product can be applied to the present invention.

In the present invention, secondary amines are preferably used. The amount of the secondary amine is about 1 to 2.0 moles, preferably 1 to 1.2 moles, per mole of the groups

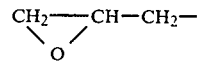

of the glycidyl compound. When a primary amine is to be used, its amount is about 0.75 to 2.0 moles, preferably 1 to 1.2 moles. In either case, the excess of the amine is desirably removed by distillation, etc. after the reaction.

The reaction of the glycidyl compound of formula (II) with the carboxylic acid or phenolic compound can be carried out under similar temperature, catalyst and solvent conditions to those in the reaction of the glycidyl compound with the primary or secondary amine.

The carboxylic acid used is a saturated or unsaturated aliphatic, aromatic or cycloaliphatic carboxylic acid of the formula

wherein Z is a residue of a carboxylic acid having 1 to 20 carbon atoms. Examples are acetic acid, propionic acid, benzoic acid and maleic acid. Preferred carboxylic acids are unsaturated aliphatic carboxylic acids having 3 or 4 carbon atoms such as acrylic acid, methacrylic acid and crotonic acid. Mixtures of these carboxylic acids can also be used.

The phenolic compound used is a compound containing a phenolic hydroxyl group which is represented by the formula

wherein Z' represents a residue of a phenolic compound having 6 to 20 carbon atoms. Examples are phenol, cresol and xylenol. Mixtures of these can also be used.

When acrylic acid is used as the carboxylic acid, the aforesaid reaction proceeds in accordance with the following scheme.

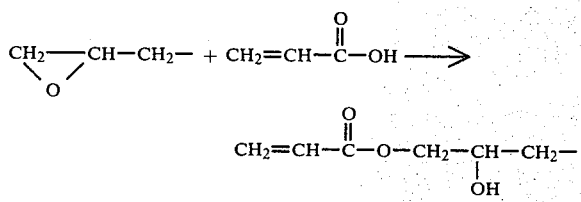

In the reaction of the glycidyl compound with the carboxylic acid or phenolic compound as in the reaction with the primary or secondary amine, it is necessary that substantially alloof the groups

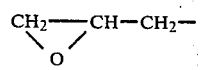

of the glycidyl compound should react with the unsaturated carboxylic acid to change to groups of the formula

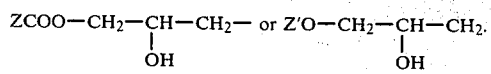

If the aforesaid glycidyl groups remain in substantial amounts, the same difficulty as in the case of reacting the primary or secondary amine would arise.

As compound (B), an amine compound of the above-given formula in which Y is

(in which $R'_3$ and $R'_4$ are as defined above) [to be referred to as compound (B')], and a compound of the above-given formula in which Y is a residue of a carboxylic acid having 1 to 20 carbon atoms (i.e., Z) or a residue of a phenolic compound having 6 to 20 carbon atoms (i.e., Z') [to be referred to as compound (B'')] may be used in combination.

Bisphenol-type epoxy resins have been known to have superior corrosion resistance. To render these resins crosslinkable, attempts have been made to leave some of the epoxy groups (Japanese Patent Publications Nos. 23807/74 and 15860/76), or to use blocked isocyanate compounds is a crosslinking agent. To obtain practical hardness, however, paints prepared from these resins require a high baking temperature of, say, more than 200° C. Even when they are curable at relatively low temperatures, the baking temperatures can be selected only from a narrow range.

Under practical electrodeposition conditions, the bisphenol-type epoxy resins must be of somewhat high molecular weight, and naturally the resulting coated film tends to be devoid of flexibility. Furthermore, if a blocked isocyanate is used for a resin having a carbon-carbon double bond, the oxidative polymerization at the time of baking will be inhibited, and a coated film having sufficient performance may not be obtained.

It is indeed surprising therefore that in accordance with the invention the compound (B) resulting from the conversion of substantially all of the groups

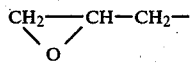

of the glycidyl compound into the groups

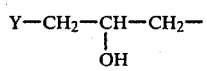

wherein Y is

in which $R'_3$ and $R'_4$ are as defined above, a residue of a carboxylic acid having 1 to 20 carbon atoms, or a residue of a phenolic compound having 6 to 20 carbon atoms can be used as one component of a cathode-precipitating electrodeposition paint together with the component (A), and as a result, the corrosion resistance of the resin (A) can be markedly improved without any deleterious effect on its excellent curability and film properties.

In the present invention, the resin (A) and the compound (B) are conveniently dissolved or dispersed in water by neutralizing them with 0.1 to 2.0 mole equivalents, preferably 0.2 to 1.0 mole equivalent, to the basic group, of an inorganic acid such as hydrochloric acid or sulfuric acid or a water-soluble organic acid such as formic acid, acetic acid, propionic acid or lactic acid.

The resin (A) and the compound (B) may be neutralized separately, and the resulting aqueous solution or aqueous dispersion may be combined. Alternatively, the two may be first mixed, and then neutralized.

The neutralization is achieved by simply mixing the resin (A) and/or the compound (B) with the acid.

If required, a dryer may be added to a composition obtained by dissolving or dispersing the resin (A) and the compound (B) in water. The dryer may, for example, be any of salts of metals such as manganese, cobalt, zinc or lead, and water-soluble manganese compounds are most suitable. Examples of the manganese compounds are manganese salts of organic acids having a relatively low molecular weight such as manganese formate, manganese acetate, manganese propionate and manganese lactate, manganese salts of inorganic acids such as manganese sulfate, manganese chloride, manganese nitrate, and acetylacetonatomanganese. The amount of the manganese compound is 0.01 to 5.0 parts by weight, preferably 0.1 to 1.0 part by weight, as manganese metal per 100 parts by weight of the resin (A).

In dissolving or dispersing the resin (A) and the compound (B) in water after neutralization, a water-soluble organic solvent capable of dissolving the resin (A) and the compound (B) is preferably added in order to facilitate the dissolution or dispersion, improve the flowability of the resin, and improve the smoothness of paint films. Examples of such an organic solvent are ethyl Cellosolve, propyl Cellosolve, butyl Cellosolve, ethylene glycol dimethyl ether, diethylene glycol dimethyl ether, diacetone alcohol, 4-methoxy-4-methylpentanon-2, and methyl ethyl ketone. The amount of the organic cmpound is 10 to 100 parts by weight per 100 parts by weight of the sum of the components (A) and (B).

Suitable pigments may also be incorporated into the cathode-precipitating electrodeposition coating composition of this invention. For example, at least one of iron oxide, lead oxide, strontium chromate, carbon black, titanium dioxide, talc, aluminum silicate, and barium sulfate can be used.

These pigments may be added directly to the composition of this invention. Alternatively, it is possible to mix a large amount of a pigment to a portion of an aqueous dispersion or solution of the resin (A) and/or [compound (B)] obtained after neutralization to obtain a paste-like master batch, and to add this batch to the composition of this invention.

The following Examples and Comparative Examples illustrate the present invention more specifically. In these examples, tests for the properties of coated films were conducted in accordance with JIS K-5400.

EXAMPLE 1

(1) Liquid polybutadiene having a number average molecular weight of 2,000, a viscosity at 25° C. of 120 poises and a 1,2-bond content of 65% was prepared by polymerizing butadiene to a low degree of polymerization at 30° C. using benzyl sodium as a catalyst in the presence of toluene as a chain transfer agent.

(2) A 2-liter separable flask equipped with a reflux condenser was charged with 1,000 g of the polybutadiene obtained in (1) above, 163 g of maleic anhydride, 10 g of xylene and 2 g of Antigen 3C (a trademark for a product of Sumitomo Chemical Co., Ltd.), and they were reacted at 190° C. for 5 hours in a stream of nitrogen. The unreacted maleic anhydride and xylene were distilled off under reduced pressure to form maleinized polybutadiene having an acid value of 80.

(3) A 2-liter separable flask equipped with a reflux condenser was charged with 803 g of the maleinized polybutadiene obtained in (2) above and 156 g of butyl Cellosolve, and they were heated to 80° C. with stirring. Then, 78 g of dimethylaminopropylamine was added dropwise, and 23 g of monoethanolamine was further added dropwise. Immediately after the addition, the temperature of the mixture was raised to 150° C., and the reaction was continued at this temperature for 4 hours. Under reduced pressure, the generated water, butyl Cellosolve and the unreacted amine were distilled off to afford imidized polybutadiene having a tertiary amino group and a hydroxyl group [resin ($A_1$)]. The imidized polybutadiene had an amine value of 50.

(4) Three hundred (300) grams of the imidized polybutadiene obtained in (3) above was dissolved in 60 g of butyl Cellosolve, and neutralized with 16.1 g of lactic acid. Deionized water was added to prepare an aqueous solution having a solids concentration of 20% by weight.

Six hundred (600) grams of the resulting aqueous solution, 190 g of titania, 3.6 g of carbon black, 106.5 g of aluminum silicate and 900 g of glass beads were put into a 2-liter stainless steel beaker, and vigorously stirred for 2 hours by a high-speed rotary mixer. The glass beads were removed by filtration to prepare a pigment paste having very good water dispersibility.

(5) Three hundred (300) grams of a compound of the formula

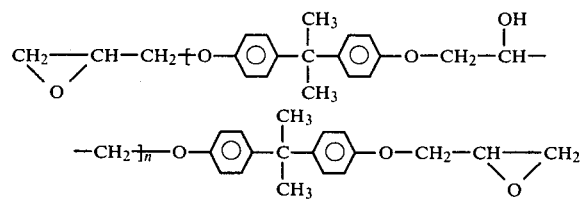

(n=about 2; average molecular weight 900) obtained by reacting bisphenol A with epichlorohydrin in the presence of an alkaline catalyst, and 60 g of diethanolamine were reacted in the presence of butyl Cellosolve at 80° C. for 4 hours to convert both terminal groups

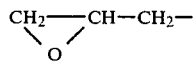

to to groups of the formula

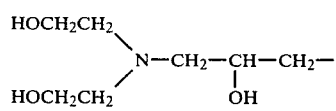

and to form an amine compound [compound ($B_1$)].

One hundred and fifty (150) grams of the imidized polybutadiene [resin ($A_1$)] obtained in (3) above and 30 g of the above amine compound ($B_1$) were dissolved in 26 g of butyl Cellosolve, and neutralized with 8.1 g of lactic acid. Deionized water was added to prepare an aqueous solution having a solids concentration of 20% by weight. To the 20% by weight aqueous solution was added 150 g of the pigment paste prepared in (4) above, and they were fully stirred. Then, deionized water having dissolved therein 6.7 g of manganese lactate of the formula

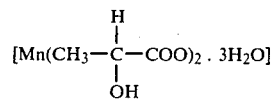

was added to prepare an electrodeposition coating solution having a solid concentration of 15% by weight.

The resulting electrodeposition coating solution was electrodeposited on an untreated steel panel [G. 3141 (SPCC-SD), 0.6×70×150 mm, a product of Nippen Test Panel Co., Ltd.] as a cathode using a carbon electrode as an anode. The results are shown in Table 1.

EXAMPLE 2

(1) Four hundred (400) grams of a glycidyl compound of the formula

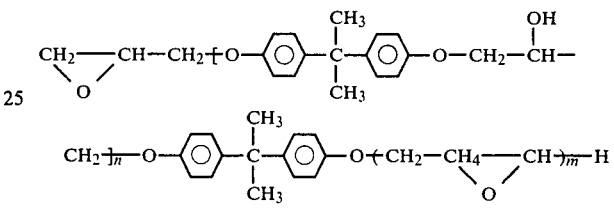

(n=4-5; average molecular weight 1400; m=0) obtained by reacting bisphenol A with epichlorohydrin in the presence of an alkaline catalyst, and 49 g of dibutylamine were reacted at 80° C. for 4 hours in the presence of 225 g of butyl Cellosolve to convert all of the terminal groups of the above glycidyl compound to groups of the formula

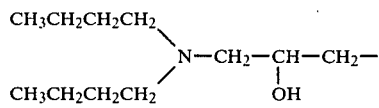

and to obtain an amine compound [compound ($B_2$)].

(2) One hundred and fifty (150) grams of the resin ($A_1$) synthesized in Example 1, (3) and 30 g of the compound ($B_2$) obtained in (1) above were dissolved in 26 g of butyl Cellosolve, and then neutralized with 8.1 g of lactic acid. Deionized water was added to prepare an aqueous solution having a solids concentration of 20% by weight. To the 20% by weight aqueous solution was added 150 g of the pigment paste obtained in Example 1, (4). They were fully stirred, and then deionized water having dissolved therein 6.7 g of manganese lactate was added to prepare an electrodeposition coating solution having a solids concentration of 15% by weight.

Electrodeposition was performed from the resulting coating solution by the same operation as in Example 1. The results are shown in Table 1.

EXAMPLE 3

(1) The polybutadiene having a number average molecular weight of 2,000 synthesized in Example 1, (1) was maleinized to form maleinized polybutadiene having an acid value of 55.

(2) A 2-liter separable flask equipped with a reflux condenser was charged with 1,105 g of the maleinized polybutadiene obtained in (1) above, and 221 g of butyl Cellosolve, and they were heated to 80° C. with stirring. Then, 100 g of dimethylamino-propylamine was added dropwise. Immediately after the addition, the mixture was heated to 150° C., and reacted at this temperature for 4 hours. The generated water, butyl Cellosolve and the unreacted amine were distilled off under reduced pressure to afford imidized polybutadiene having a tertiary amino group and an amine value of 50 [resin $(A_2)$].

(3) One hundred and fifty (150) grams of the resulting imidized polybutadiene and 30 g of the amine compound $(B_1)$ obtained in Example 1 were dissolved in 26 g of butyl Cellosolve and neutralized with 8.1 g of lactic acid. Deionized water was added to prepare an aqueous solution having a solids concentration of 20% by weight. To the 20% by weight aqueous solution was added 150 g of the pigment paste prepared in Example 1, (4), and they were fully stirred. Deionized water having dissolved therein 6.7 g of manganese lactate was added to prepare an electrodeposition coating solution having a solids concentration of 15% by weight.

Electrodeposition was performed from the resulting coating solution by the same operation as in Example 1. The results are shown in Table 1.

COMPARATIVE EXAMPLE 1

One hundred and fifty (150) grams of the imidized polybutadiene $(A_1)$ synthesized in Example 1, (3) was dissolved in 30 g of butyl Cellosolve, and neutralized with 8.1 g of lactic acid. Deionized water was added to form a 20% aqueous by weight aqueous solution. To the aqueous solution was added 125 g of the pigment paste prepared in Example 1, (4), and further, deionized water having dissolved therein 5.6 g of manganese lactate was added to prepare an electro-deposition coating solution having a solids concentration of 15% by weight.

Electrodeposition was performed from the resulting coating solution by the same operation as in Example 1. The results are shown in Table 1.

COMPARATIVE EXAMPLE 2

One hundred and fifty (150) grams of the imidized polybutadiene [resin $(A_2)$] synthesized in Example 3 was dissolved in 30 g of butyl Cellosolve, and neutralized with 8.1 g of lactic acid. By the same operation as in Comparative Example 1, the pigment paste and manganese lactate were added to prepare an electrodeposition coating solution having a solids concentration of 15% by weight.

Electrodeposition was performed from the resulting solution by the same operation as in Example 1. The results are shown in Table 1.

COMPARATIVE EXAMPLE 3

One hundred and fifty (150) grams of the amine compound $(B_1)$ synthesized in Example 1, (5) was dissolved in 30 g of butyl Cellosolve, and neutralized with 14.3 g of lactic acid. Deionized water was added to prepare an aqueous solution having a solids concentration of 12% by weight.

Electrodeposition was performed from the resulting aqueous solution by the same operation as in Example 1. A coated film baked at 180° C. for 30 minutes was smooth and tack-free. But when it was dipped in a solvent such as xylene, it was dissolved, and became useless.

COMPARATIVE EXAMPLE 4

One hundred and fifty (150) grams of the imidized polybutadiene [resin $(A_1)$] synthesized in Example 1, (3) and 30 g of the same glycidyl compound (n=about 2; average molecular weight 900) as used in Example 1, (5) were dissolved in 36 g of butyl Cellosolve. Then 8.1 g of lactic acid was added in an attempt to neutralize them, but the viscosity of the mixture gradually increased. Deionized water was added in an attempt to obtain a diluted aqueous solution, but gellation occurred and a paint solution coating solution could not be obtained.

It is seen from Examples 1 to 3 and Comparative Examples 1 and 2 that by using a paint composition consisting essentially of a specified amine compound [component (B)] and polybutadiene having an amino group bonded through a maleimide group [component (A)], both being neutralized and dissolved in water, for cathode-precipitating electrodeposition, the corrosion resistance of a paint film on an untreated steel plate can be increased markedly without impairing the superior physical properties of a paint film from the component (A). It is seen from Comparative Example 3 that the specified amine compound [component (B)] alone cannot give a practical paint film. It is seen from Comparative Example 4 that polybutadiene containing an amino group bonded through a maleimide group undergoes gellation in the presence of a free glycidyl group at the time of water solubilization, and cannot give a coating solution of good quality.

TABLE 1

| | Example 1 | Example 2 | Example 3 | Comparative Example 1 | Comparative Example 2 |
|---|---|---|---|---|---|
| Coating conditions | | | | | |
| Voltage (V) | 200 | 200 | 200 | 200 | 200 |
| Time (minutes) | 3 | 3 | 3 | 3 | 3 |
| Baking conditions [temperature (°C.) × time (minutes)] | 180 × 30 | 180 × 30 | 180 × 30 | 180 × 30 | 180 × 30 |
| Coated thickness (microns) | 22 | 20 | 20 | 19 | 21 |
| Physical tests | | | | | |
| Pencil hardness | H | 2H | 2H | H | H |
| Sketching | Good | Good | Good | Good | Good |
| Crosscut tape test | 100/100 | 100/100 | 100/100 | 100/100 | 100/100 |
| Erichsen (mm) | >7 | >7 | >7 | >7 | >7 |
| Impact strength (cm) (*1) | | | | | |
| Top surface | >50 | >50 | >50 | >50 | >50 |
| Back surface | >50 | >50 | >50 | >50 | >50 |
| Chemical tests | | | | | |
| Alkali resistance (hours) (*2) | >60 | >60 | >60 | >60 | >60 |
| Acid resistance (hours) (*3) | >24 | >24 | >24 | >24 | >24 |
| Solvent resistance (hours) (*4) | >24 | >24 | >24 | >24 | >24 |

TABLE 1-continued

|  | Example 1 | Example 2 | Example 3 | Comparative Example 1 | Comparative Example 2 |
|---|---|---|---|---|---|
| Water resistance (days) (*5) | >30 | >30 | >30 | >30 | >30 |
| Corrosion resistance (*6) | | | | | |
| 48 hours | ◎ | ◎ | ◎ | Δ | Δ |
| 240 hours | ◎ | ◎ | ◎ | X | X |

(*1) The maximum height of a ball fall which does not cause the breakage of the coated film (500 g, ½ B).
(*2) The time that elapses until a change, such as blistering, occurs in the coated film (when immersed in 5% NaOH).
(*3) The time that elapses until a change, such as blistering, occurs in the coated film (when immersed in 5% $H_2SO_4$).
(*4) The time that elapses until a change, such as blistering, occurs in the coated film (when immersed in a 1:1 mixture of toluene and xylene).
(*5) The time that elapses until a change, such as blistering, occurs in the coated film (when immersed in pure water at 40° C.).
(*6) The maximum rust width (mm) from a cut portion provided in the coated film (a spray of a 5% aqueous solution of NaCl). Evaluated on the following scale.
◎ : less than 1 mm
○ : 1 to 2 mm
Δ: more than 2 mm to 3 mm
X: more than 3 mm

EXAMPLE 4

(1) One thousand (1,000) grams of a bisphenol-type epoxy resin (Epikote 1001, a product of Shell Chemical Co.) having an epoxy equivalent of 500 and corresponding to the following formula

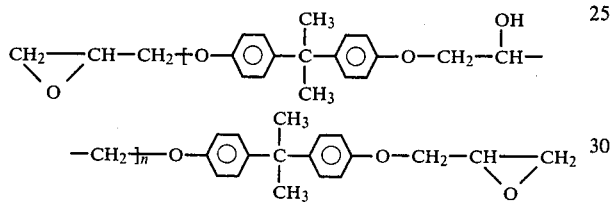

which had been obtained by reacting bisphenol A with epichlorohydrin in the presence of an alkaline catalyst was dissolved in 227 g of butyl Cellosolve, and 137 g of acrylic acid, 0.2 g of hydroquinone and 5 g of N,N-dimethylaminoethanol were added. The mixture was heated at 100° C. for 5 hours to prepare a butyl Cellosolve solution of an epoxy resin/acrylic acid adduct [compound ($B_3$)].

(2) One hundred and fifty (150) grams of the resin ($A_1$) obtained in Example 1, (3) and 50 g of the compound ($B_3$) obtained in (1) above were dissolved in 30 g of butyl Cellosolve, and then neutralized with 8.1 g of lactic acid. Deionized water was added to prepare an aqueous solution having a solids concentration of 20% by weight. To the 20% by weight aqueous solution was added 150 g of the pigment paste obtained in Example 1, (4), and the mixture was well stirred. Then, deionized water having dissolved therein 6.7 g of manganese lactate was added to prepare an electrodeposition coating solution having a solids concentration of 15% by weight.

Electrodeposition was performed from the resulting coating solution by the same operation as in Example 1. The test results are shown in Table 2.

EXAMPLE 5

(1) One thousand (1,000) grams of a bisphenol-type epoxy resin (Epikote 1004, a product of Shell Chemical Co.) having an epoxy equivalent of 1,000 was dissolved in 214 g of butyl Cellosolve, and 69 g of acrylic acid, 0.1 g of hydroquinone and 5 g of N,N-dimethylaminoethanol were added. The mixture was subjected to the same reaction conditions as in Example 4, (1) to afford a butyl Cellosolve solution of an epoxy resin/acrylic acid adduct [compound ($B_4$)].

(2) One hundred and fifty (150) grams of the amino-containing polybutadiene resin ($A_1$) prepared in Example 1, (3) and 50 g of the compound ($B_4$) obtained in (1) above were dissolved in 30 g of butyl Cellosolve, and neutralized with 8.1 g of lactic acid. Deionized water was added to prepare an aqueous solution having a solids concentration of 20% by weight. To the 20% by weight aqueous solution was added 150 g of the pigment paste prepared in Example 1, (4). The mixture was fully stirred, and deionized water having 6.7 g of manganese lactate dissolved therein was added to prepare an electrodeposition coating solution having a solids concentration of 15% by weight.

Electrodeposition was performed from the resulting coating solution by the same operation as in Example 1. The results are shown in Table 2.

EXAMPLE 6

One hundred and fifty (150) grams of the amino-containing polybutadiene resin ($A_2$) prepared in Example 3, (1) and 50 g of the compound ($B_3$) obtained in Example 4 were dissolved in 26 g of butyl Cellosolve, and then neutralized with 8.1 g of lactic acid. Deionized water was added to prepare an aqueous solution having a solids concentration of 20% by weight. To the 20% by weight aqueous solution was added 150 g of the pigment paste produced in Example 1, (4), and the mixture was stirred well. Deionized water having 6.7 g of manganese lactate dissolved therein was added to prepare an electrodeposition coating solution having a solids concentration of 15% by weight.

Electrodeposition was performed from the resulting coating solution by the same operation as in Example 1. The results are shown in Table 2.

EXAMPLE 7

(1) Six hundred (600) grams of a bisphenol-type epoxy resin having an epoxy equivalent of 500 and 330 g of linseed fatty acid (L-70, acid value 193.1 mg KOH/g) were dissolved in 186 g of butyl Cellosolve, and 3 g of N,N-dimethylaminoethanol was added. The mixture was maintained at 110° C. for 4 hours to afford a compound ($B_5$).

(2) One hundred and fifty (150) grams of the resin ($A_1$) prepared in Example 1 and 70 g of the compound ($B_5$) obtained in (1) above were dissolved in 30 g of butyl Cellosolve, and neutralized with 9.7 g of lactic acid. By the same operation as in Example 6, the pigment paste and manganese lactate were added to prepare an electrodeposition coating solution having a solids concentration of 15% by weight.

Electrodeposition was performed from the resulting coating solution by the same operation as in Example 1. The results are shown in Table 2.

EXAMPLE 8

(1) Eight hundred (800) grams of a bisphenol-type epoxy resin having an epoxy equivalent of 500 and 91.3 g of acetic acid were dissolved in 178 g of butyl Cellosolve, and 4 g of N,N-dimethylaminoethanol was added. The mixture was maintained at 110° C. for 6 hours to afford a compound ($B_6$).

(2) One hundred and fifty (150) grams of the resin ($A_1$) prepared in Example 1 and 50 g of the resulting compound ($B_6$) were dissolved in 30 g of butyl Cellosolve, and neutralized with 9.7 g of lactic acid. By the same operation as in Example 6, the pigment paste and manganese lactate were added to prepare an electrodeposition coating solution having a solids concentration of 15% by weight.

It is seen from Examples 4 to 8 that a cathode-depositing electrodeposition coating composition consisting essentially of a resin composed of an amino-containing polybutadiene [component (A)] and a specified compound [component (B)] obtained by reacting a glycidyl compound with a carboxylic acid exhibits a markedly improved corrosion resistance on a non-treated steel plate without impairing the excellent film properties of the resin (A). The improvement is especially outstanding when an unsaturated carboxylic acid is used.

zation of petroleum cracking fractions containing 4 to 10 carbon atoms with a Friedel-Crafts catalyst, said unsaturated organic compound having bonded thereto, through a carbon-carbon bond, basic groups of the formula

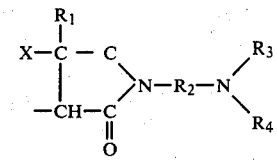

wherein $R_1$ represents a hydrogen or halogen atom or a hydrocarbon group having 1 to 3 carbon atoms, $R_2$ represents a hydrocarbon group having 1 to 20 carbon atoms, $R_3$ and $R_4$ represent a hydrogen atom or a hydrocarbon group having 1 to 20 carbon atoms which may be partly replaced by a hydroxyl group, at least one of $R_3$ and $R_4$ is said hydrocarbon group, X represents a hydrogen atom, or a bond, and when X represents a bond, the carbon atom to which $R_1$ is attached and the adjacent carbon atom to which hydrogen is attached may form a part of the main chain, the amount of said basic groups in said component (A) being 0.05 to 0.5 mole per 100 g of said component (A), and (B) 3 to 100 parts by weight of at least one compound

TABLE 2

|  | Example 4 | Example 5 | Example 6 | Example 7 | Example 8 |
|---|---|---|---|---|---|
| Coating conditions |  |  |  |  |  |
| Voltage (V) | 100 | 150 | 100 | 100 | 150 |
| Time (minutes) | 3 | 3 | 3 | 3 | 3 |
| Baking conditions [temperature (°C.) × time (minutes)] | 180 × 30 | 180 × 30 | 180 × 30 | 180 × 30 | 180 × 30 |
| Coated thickness (microns) | 20 | 20 | 19 | 19 | 20 |
| Physical tests |  |  |  |  |  |
| Pencil hardness | 2H | 2H | 2H | H | 2H |
| Sketching | Good | Good | Good | Good | Good |
| Crosscut tape test | 100/100 | 100/100 | 100/100 | 100/100 | 100/100 |
| Erichsen (mm) | >7 | >7 | >7 | >5 | >7 |
| Impact resistance (cm) (*1) |  |  |  |  |  |
| Top surface | >50 | >50 | >50 | >50 | >50 |
| Back surface | >50 | >50 | >50 | >10 | >50 |
| Chemical tests |  |  |  |  |  |
| Alkali resistance (hours) (*2) | >60 | >60 | >60 | >60 | >60 |
| Acid resistance (hours) (*3) | >24 | >24 | >24 | >24 | >24 |
| Solid resistance (hours) (*4) | >24 | >24 | >24 | >24 | >24 |
| Water resistance (days) (*5) | >30 | >30 | >30 | >30 | >30 |
| Corrosion resistance |  |  |  |  |  |
| 48 hours | ◎ | ◎ | ◎ | Δ | ◎ |
| 240 hours | ◎ | ◎ | ◎ | X | Δ |

What we claim is:

1. A coating composition for cathode-precipitating electrodeposition consisting essentially of
   (A) 100 parts by weight of an unsaturated organic compound having a molecular weight of 300 to 5,000 containing a carbon-carbon double bond in an amount corresponding to an iodine value of 100 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having ethylenic unsaturation containing 2 to 20 carbon atoms, (d) a natural oil, (e) a natural fat and (f) a petroleum resin produced by cationic polymerirepresented by the general formula

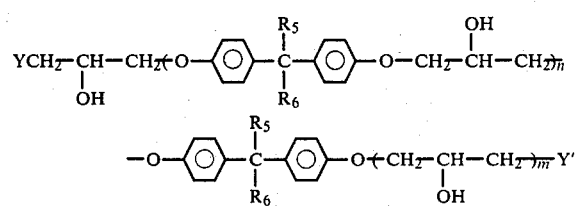

wherein $R_5$ and $R_6$, independently from each other, represent a hydrogen atom or an alkyl group having 1 to 10 carbon atoms, n is an integer of from 0 to 20, m is 1 or 0, Y is a group of the formula $$\begin{array}{c} R'_3 \\ | \\ R'_4-N- \end{array}$$

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a residue of a phenolic compound having 6 to 20 carbon atoms, and Y' represents a hydrogen atom when m is O and Y when m is 1, said component (A) and said component (B) being neutralized with an organic acid or an inorganic acid and dissolved or dispersed in water.

2. The composition of claim 1 wherein $R_3$ and $R_4$, independently from each other, represent a hydrogen atom, or a hydrocarbon radical having 1 to 10 carbon atoms, said hydrocarbon radical being unsubstituted or partially substituted by a hydroxyl group.

3. The composition of claim 2 wherein $R_1$ and $R_2$, independently from each other, represent a hydrogen atom or a methyl group.

4. The composition of claim 1 wherein said component (B) is a compound obtained by reacting a glycidyl compound of the following formula $$CH_2\!-\!CH\!-\!CH_2\!\!\left[\!O\!-\!\!\left\langle\bigcirc\right\rangle\!\!-\!\!\underset{\underset{R_6}{|}}{\overset{\overset{R_5}{|}}{C}}\!-\!\!\left\langle\bigcirc\right\rangle\!\!-\!O\!-\!CH_2\!-\!\underset{OH}{\overset{}{C}H}\!-\!CH_2\!\right]_{\!n}$$

$$-O\!-\!\!\left\langle\bigcirc\right\rangle\!\!-\!\!\underset{\underset{R_6}{|}}{\overset{\overset{R_5}{|}}{C}}\!-\!\!\left\langle\bigcirc\right\rangle\!\!-\!O\!\!\left[\!CH_2\!-\!CH\!-\!CH\!\right]_{\!m}\!\!-\!H$$

wherein $R_5$, $R_6$, m and n are as defined, with a primary or secondary amine of the formula $$\begin{array}{c} R'_3 \\ | \\ R'_4-N-H \end{array}$$

wherein $R_3'$ and $R_4'$ are as defined, at a temperature of from 0° to 200° C. to convert substantially all of groups $$CH_2\!-\!\!\!-\!CH\!-\!CH_2\!-\!\!\!$$

in said glycidyl compound to groups of the formula $$R_4'\!-\!\!\!\underset{}{\overset{\overset{R_3'}{|}}{N}}\!-\!CH_2\!-\!CH\!-\!CH_2\!-\!\!\!\!$$
$$\phantom{R_4'\!-\!\!\!N\!-\!CH_2\!-\!}\underset{OH}{|}$$

wherein $R'_3$ and $R'_4$ are as defined.

5. The composition of claim 1 wherein said component (B) is a compound obtained by reacting a glycidyl compound of the formula $$CH_2\!-\!CH\!-\!CH_2\!\!\left[\!O\!-\!\!\left\langle\bigcirc\right\rangle\!\!-\!\!\underset{\underset{R_6}{|}}{\overset{\overset{R_5}{|}}{C}}\!-\!\!\left\langle\bigcirc\right\rangle\!\!-\!O\!-\!CH_2\!-\!\underset{OH}{\overset{}{C}H}\!-\!CH_2\!\right]_{\!n}$$

$$-O\!-\!\!\left\langle\bigcirc\right\rangle\!\!-\!\!\underset{\underset{R_6}{|}}{\overset{\overset{R_5}{|}}{C}}\!-\!\!\left\langle\bigcirc\right\rangle\!\!-\!O\!\!\left[\!CH_2\!-\!CH\!-\!CH\!\right]_{\!m}\!\!-\!H$$

wherein $R_5$, $R_6$, m and n are as defined, with a carboxylic acid of the formula

Z-COOH wherein Z represents a residue of a carboxylic acid having 1 to 20 carbon atoms, or a phenolic compound of the formula

Z'-OH wherein Z' represents a residue of a phenolic compound having 6 to 20 carbon atoms, at a temperature of from 0° to 200° C. to convert substantially all of groups $$CH_2\!-\!\!\!-\!CH\!-\!CH_2\!-\!\!\!$$

of said glycidyl compound to groups of the formula $$ZCOO\!-\!CH_2\!-\!CH\!-\!CH_2\!-\!\!\!$$
$$\phantom{ZCOO\!-\!CH_2\!-\!}\underset{OH}{|}$$

wherein Z is as defined, or groups of the formula $$Z'O\!-\!CH_2\!-\!CH\!-\!CH_2\!-\!\!\!$$
$$\phantom{Z'O\!-\!CH_2\!-\!}\underset{OH}{|}$$

wherein Z' is as defined.

6. The composition of claim 5 wherein Z represents a residue of an unsaturated carboxylic acid having 3 or 4 carbon atoms.

7. The composition of claim 6 wherein said unsaturated carboxylic acid is represented by the formula $$\begin{array}{cc} H & O \\ | & \| \\ C\!=\!C\!-\!C\!-\!OH \\ | & | \\ R_7 & R_8 \end{array}$$

wherein $R_7$ and $R_8$ represent a hydrogen atom or a methyl group, and at least one of them represents a hydrogen atom.

8. The composition of claim 1 wherein said component (B) consists of a compound (B') of the formula for (B) in which Y is $$\begin{array}{c} R'_3 \\ | \\ R'_4-N- \end{array}$$

in which $R'_3$ and $R'_4$ are as defined and a compound (B'') of the formula for (B) in which Y is the residue of carboxylic acid or phenolic compound, the total amount of said compounds (B') and (B'') being 3 to 100 parts per 100 parts by weight of component (A).

* * * * *

UNITED STATES PATENT AND TRADEMARK OFFICE
CERTIFICATE OF CORRECTION

PATENT NO. : 4,265,793
DATED : May 5, 1981
INVENTOR(S) : Hiroyoshi Omika, Hajime Hara, Yutaka Otsuki, Yoshihiko Araki and Kazuho Aoyama It is certified that error appears in the above-identified patent and that said Letters Patent are hereby corrected as shown below:

In the Abstract, line 9; Column 2, formula bridging lines 13 and 23 and Column 18, formula bridging lines 5 and 14, change:

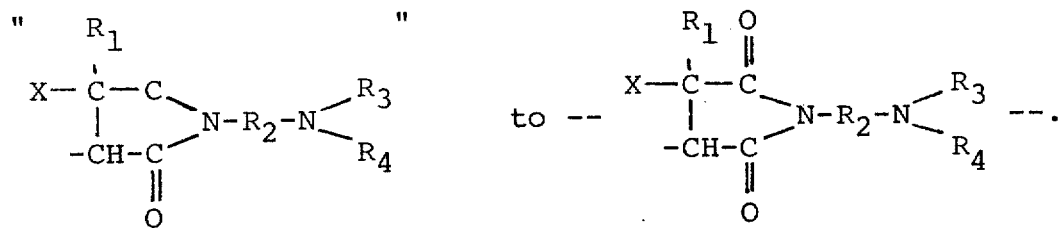

Column 5, formula bridging lines 13 and 23, change:

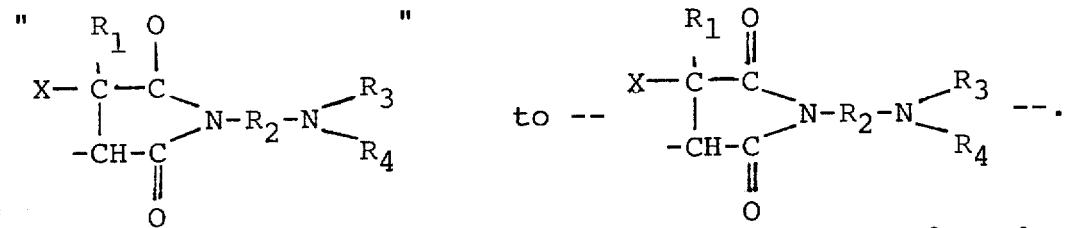

Signed and Sealed this

Thirteenth Day of April 1982

[SEAL]

Attest:

GERALD J. MOSSINGHOFF

Attesting Officer    Commissioner of Patents and Trademarks